United States Patent
Nilsen et al.

(10) Patent No.: US 7,372,878 B2
(45) Date of Patent: May 13, 2008

(54) METHOD AND SYSTEM FOR PREVENTING EXCESSIVE ENERGY BUILD-UP IN A LASER CAVITY

(75) Inventors: Brady Nilsen, Beaverton, OR (US); Steve Stone, Seattle, WA (US)

(73) Assignee: Electro Scientific Industries, Inc., Portland, OR (US)

( * ) Notice: Subject to any disclaimer, the term of this patent is extended or adjusted under 35 U.S.C. 154(b) by 327 days.

(21) Appl. No.: 10/931,460

(22) Filed: Aug. 31, 2004

(65) Prior Publication Data

US 2006/0029113 A1 Feb. 9, 2006

Related U.S. Application Data

(60) Provisional application No. 60/599,640, filed on Aug. 6, 2004.

(51) Int. Cl.
*H01S 3/10* (2006.01)

(52) U.S. Cl. ............................................. 372/10; 372/9

(58) Field of Classification Search ............... 372/9, 372/10
See application file for complete search history.

(56) References Cited

U.S. PATENT DOCUMENTS

| | | | | |
|---|---|---|---|---|
| 4,930,901 | A * | 6/1990 | Johnson et al. ............... 372/26 |
| 5,016,251 | A * | 5/1991 | D'Arcy ........................ 372/10 |
| 5,339,323 | A | 8/1994 | Hunter et al. |
| 5,719,372 | A * | 2/1998 | Togari et al. ............ 219/121.61 |
| 6,009,110 | A * | 12/1999 | Wiechmann et al. ......... 372/10 |
| 6,172,325 | B1 | 1/2001 | Baird et al. |
| 6,300,590 | B1 | 10/2001 | Lauer et al. |
| 6,339,604 | B1 | 1/2002 | Smart |
| 6,559,412 | B2 | 5/2003 | Lauer et al. |
| 6,662,063 | B2 | 12/2003 | Hunter et al. |
| 6,706,999 | B1 | 3/2004 | Barrett et al. |
| 6,947,454 | B2 | 9/2005 | Sun et al. |
| 6,973,104 | B2 * | 12/2005 | Smart ........................ 372/13 |
| 2002/0165781 | A1 | 11/2002 | Cordingley et al. |
| 2003/0081636 | A1 | 5/2003 | Wang |
| 2004/0134894 | A1 | 7/2004 | Gu et al. |
| 2004/0134896 | A1 | 7/2004 | Gu et al. |
| 2004/0202207 | A1 | 10/2004 | Wang |
| 2006/0029113 | A1 | 2/2006 | Nilsen et al. |

FOREIGN PATENT DOCUMENTS

JP 04-098801 3/1992

* cited by examiner

*Primary Examiner*—Dung (Michael) T. Nguyen
(74) *Attorney, Agent, or Firm*—Stoel Rives LLP

(57) ABSTRACT

A method and system decrease the amount of undesired laser radiation reaching a workpiece from a laser having a laser cavity and a Q-switch. The laser operates at any given time in one of at least two modes. In a first mode the laser emits pulses at a PRF (pulse repetition frequency) for selectively irradiating targets on or within a workpiece, and the pulses propagate along a propagation path to the workpiece. In a second mode less or no laser radiation desirably reaches the workpiece. The method is operable during the second mode. The method opens the Q switch more than the Q switch is open in the first mode, thereby limiting the amount of energy that builds up in the laser cavity and decreasing the peak energy of the laser radiation emitted in the second mode.

23 Claims, 3 Drawing Sheets

METHOD AND SYSTEM FOR PREVENTING EXCESSIVE ENERGY BUILD-UP IN A LASER CAVITY

RELATED APPLICATION

This application claims priority under 35 U.S.C. § 119 to U.S. Provisional Application No. 60/599,640, entitled "Method and System for Preventing Excessive Energy Build-Up in a Laser Cavity," filed Aug. 6, 2004, which is incorporated by reference herein in its entirety.

TECHNICAL FIELD

This disclosure relates generally to operation of a pulsed laser and more particularly to the use of a pulsed laser to process a semiconductor integrated circuit during its manufacturing.

BACKGROUND

During their fabrication process, ICs (integrated circuits) often incur defects due to minor imperfections in the process or in the semiconductor material. For that reason, ICs are usually designed to contain redundant circuit elements, such as spare rows and columns of memory cells in semiconductor memory devices, e.g., a DRAM (dynamic random access memory), an SRAM (static random access memory), or an embedded memory. Such devices are also designed to include particular laser-severable links between electrical contacts of the redundant circuit elements. Such links can be removed, for example, to disconnect a defective memory cell and to substitute a replacement redundant cell. Similar techniques are also used to sever links in order to program or configure logic products, such as gate arrays or ASICs (application-specific integrated circuits). After an IC has been fabricated, its circuit elements are tested for defects, and the locations of defects may be recorded in a data file or defect map. Combined with positional information regarding the layout of the IC and the location of its circuit elements, a laser-based link processing system can be employed to remove selected links so as to make the IC useful.

A typical link processing system adjusts the position of the laser beam spot on a semiconductor wafer by moving the wafer in an XY plane underneath a stationary optics table, which supports a laser and other optical hardware. The wafer is moved underneath in the XY plane by placing it on a chuck that is carried by a motion stage. A typical wafer contains a number of dies, each containing an IC. Circuit elements within an IC that are typically arranged in a regular geometric arrangement, as are the links between those elements. The links usually lie in regular rows in groups which are termed "link banks," having an approximately uniform center-to-center pitch spacing. To remove selected links in a link bank, a beam spot (i.e., the position at which the laser beam's propagation path axis intersects the wafer workpiece) continuously advances along the link bank at an approximately uniform speed while the laser emits pulses to selectively remove links. The laser is triggered to emit a pulse and thereby to sever a link at a selected target position when the laser beam spot is on the target position. As a result, some of the links are not irradiated and left as unprocessed links, while others are irradiated to become severed. The process of progressing down a row of links and severing selected links with a laser pulse is termed a "link run."

The laser in a typical link processing system is a Q-switched cavity laser that generates pulses at a pulse repetition frequency ("PRF"). When the Q switch is closed, energy builds up in the laser cavity. When the Q switch is opened, the built-up energy is released as a laser beam pulse. The process of opening and closing the laser's Q switch occurs repeatedly at a rate equal to the PRF.

Problems can arise if the Q switch is closed for an undesirably long period of time resulting in an undesirably large amount of energy accumulated in the laser cavity. The accumulated energy will eventually be released when the Q switch is opened. The resultant laser pulse can have greater energy than is desired to accomplish certain tasks and may damage the workpiece, components of the optics path, or the laser itself. Furthermore, leaving the Q switch closed for a period of time longer than occurs during nominal PRF operations may perturb the thermal equilibrium of the laser cavity or any wavelength-altering optic elements along the laser beam's propagation path. This may undesirably alter the laser pulse properties.

SUMMARY

According to one embodiment, a method decreases the amount of undesired laser radiation reaching a workpiece from a laser having a laser cavity and a Q-switch. The laser operates at any given time in one of at least two modes. In a first mode the laser emits pulses at a PRF for selectively irradiating targets on or within a workpiece, and the pulses propagate along a propagation path to the workpiece. In a second mode less or no laser radiation desirably reaches the workpiece. The method is operable during the second mode. The method opens the Q switch more than the Q switch is open in the first mode, thereby limiting the amount of energy that builds up in the laser cavity and decreasing the peak energy of the laser radiation emitted in the second mode.

According to another embodiment, a method decreases the amount of undesired laser radiation reaching a workpiece from a laser having a laser cavity and a Q switch. The method operates the laser in a processing mode in which the Q switch is repeatedly opened and closed so as to cause the laser to emit pulses approximately periodically at a PRF for selectively irradiating targets on or within a workpiece. The pulses propagate along a propagation path toward the workpiece. The method also operates the laser in a non-processing mode in which the Q switch is open more often than the Q switch is open in the processing mode, thereby limiting the amount of energy that builds up in the laser cavity and causing the laser to emit less radiation than in the processing mode.

According to yet another embodiment, a system selectively decreases the amount of laser radiation reaching a workpiece. The system comprises a pulsed laser having a Q switch, a laser beam propagation path from the laser to the workpiece, and a controller connected to the Q switch. The controller generates a control signal that causes the Q switch to open or to close. The controller operates in at least two modes. In a first mode the Q switch is closed for a predetermined charging time before being opened to emit a pulse having a predetermined energy related to the predetermined charging time. In a second mode the Q switch is closed, if at all, for no continuous time as long as the predetermined charging time, whereby the laser emits radiation at an energy level less than the predetermined energy.

Details concerning the construction and operation of particular embodiments are set forth in the following sections with reference to the below-listed drawings.

DETAILED DESCRIPTION OF EMBODIMENTS

With reference to the above-listed drawings, this section describes particular embodiments and their detailed construction and operation. As one skilled in the art will appreciate, certain embodiments may be capable of achieving certain advantages over the known prior art, including some or all of the following: (1) improved control of the amount of laser radiation reaching a workpiece; (2) greater suppression of laser emissions reaching the workpiece during idle times; (3) enhanced reading of alignment areas on a workpiece with less damage to the alignment areas, and (4) greater utilization of AOM devices that have a reduced ability to block optical pulses. These and other advantages of various embodiments will be apparent upon reading the following.

Figure 1:
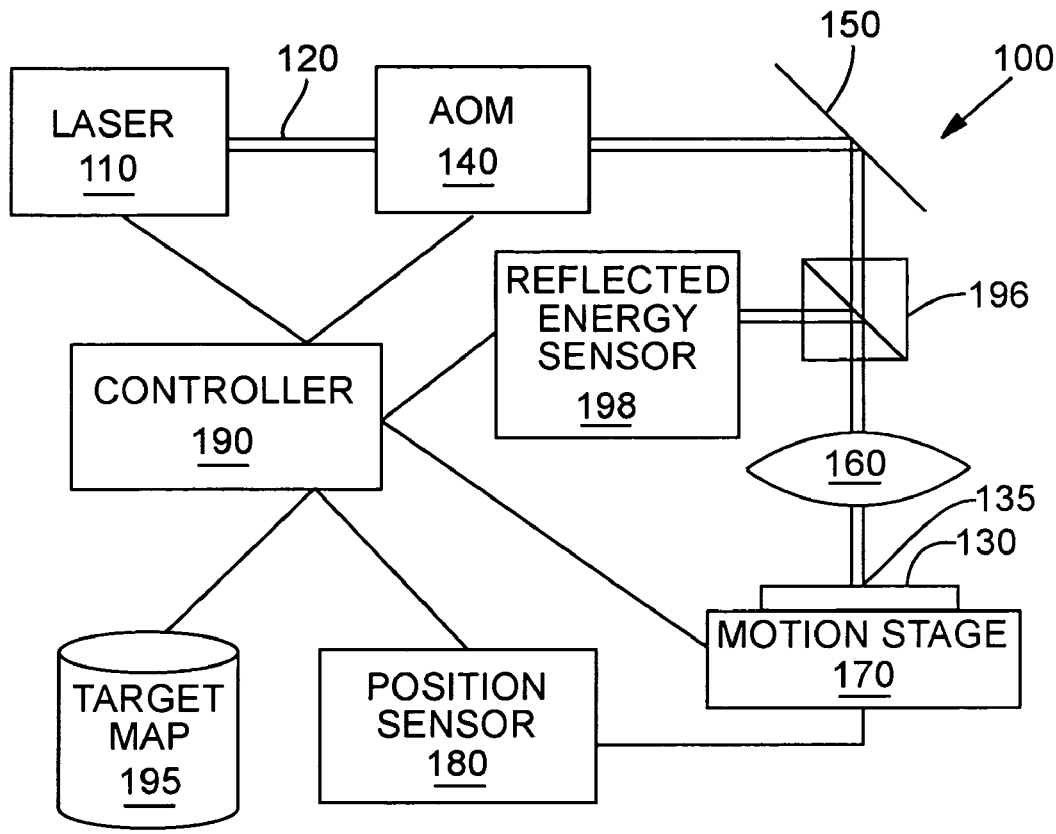
FIG. 1 is a block diagram of a link processing system.

FIG. 1 is a block diagram of a link processing system 100. The system 100 comprises a laser 110, which produces a laser beam 120. The laser beam 120 propagates along a propagation path until it reaches a workpiece 130 at a laser beam spot 135. Disposed along the propagation path are a number of optics elements, including an acoustic-optical modulator (AOM) 140, a mirror 150, and a focusing lens 160. The AOM 140 is responsive to a radio frequency (RF) input, which changes the direction in which the laser beam 120 exits the AOM 140. By selectively driving the AOM 140 with an RF signal having an appropriate amplitude, the AOM 140 can be configured to selectively block or pass the laser beam 120 to the mirror 150, through the lens 160, and onto the workpiece 130. In other words, the AOM 140 behaves like a light switch or shutter in the laser beam propagation path. It is additionally possible to use the AOM 140 in a partially transmitting state by driving the AOM 140 with RF power of reduced amplitude. This mode is useful for reducing, but not completely blocking, the laser emissions that propagate along the laser beam propagation path.

Any device capable of functioning as a light switch or shutter can be used in place of the AOM 140. An electro-optic-modulator EOM and a liquid crystal modulator are examples of some alternative devices.

The workpiece 130 is mounted to a motion stage 170 that moves the workpiece in an XY plane (the laser beam 120 being incident upon the workpiece in the Z direction). A position sensor 180 senses where the workpiece 130 is relative to the laser beam spot 135 and reports that position data to a controller 190. The controller 190 also accesses a target map 195, which contains data indicating target positions on the workpiece 130 that should be irradiated (e.g., to sever a link at that position). The target map 195 is typically generated, for example, from a testing process that determines which circuit elements in the workpiece 130 are defective. The controller 190 choreographs the pulsing of the laser 110, the shuttering of the AOM 140, and the moving of the motion stage 170 so that the laser beam spot 135 traverses over each target and emits a laser pulse that reaches the workpiece at the targets. The controller 190 preferably controls the system 100 based on position data, as that approach provides very accurate placement of link blows. U.S. Pat. No. 6,172,325, assigned to the assignee of the present invention and incorporated in its entirety herein by reference, describes laser pulse-on-position technology.

As used herein, the phrase "laser beam spot" is actually a shorthand expression for the spot at which the axis of the laser beam's propagation path intersects the workpiece 130. To be precise, the laser beam is sometimes on and sometimes off. The spot at which the axis of the laser beam's propagation path intersects the workpiece 130, however, is always present and moves along the surface of the workpiece 130 as the motion stage 170 moves.

FIG. 1 also depicts a beam splitter 196 and a reflected energy sensor 198, which are used during an alignment mode to collect reflected energy from the workpiece 130 and to measure that energy. In a typical X or Y alignment scan, the laser beam spot 135 is scanned across an alignment feature on the workpiece 130. The reflection off the workpiece 130 passes through the beam splitter 196 to the reflected energy sensor 198, which conveys its readings to the controller 190. The reflected energy readings correspond to numerous position coordinates from the position sensor 180. Differences in the received reflected power when the laser spot falls upon the alignment feature, and the workpiece surrounding the alignment feature, are interpreted by the controller 190, along with the position coordinates, to deduce the location of the alignment feature in the coordinate system of the position sensor 180. Typically, the alignment feature is more highly reflective than the workpiece 130 surrounding the alignment feature, resulting in increased optical power received by the reflected energy sensor 198 when the laser beam spot 135 overlaps with the alignment feature. Comparison of the feature location determined through the alignment scan process with reference data indicating the target location (e.g., the target map 195 or CAD (computer-aided design) data) can be used to calibrate the location of the workpiece 130 in the coordinate system of the laser processing system 100. As used herein, the term "alignment" encompasses X-Y alignment, Z depth focusing, and all other types of calibration.

Note that it is immaterial whether the laser and its associated optics are stationary and the workpiece moves, or vice versa, or some combination of movement by both bodies occurs. All that is required is the laser beam spot and the workpiece move relative to one another. Note also that the purpose of the laser irradiation could be anything, not just link blowing, e.g., drilling, machining, component trimming.

Figure 2:
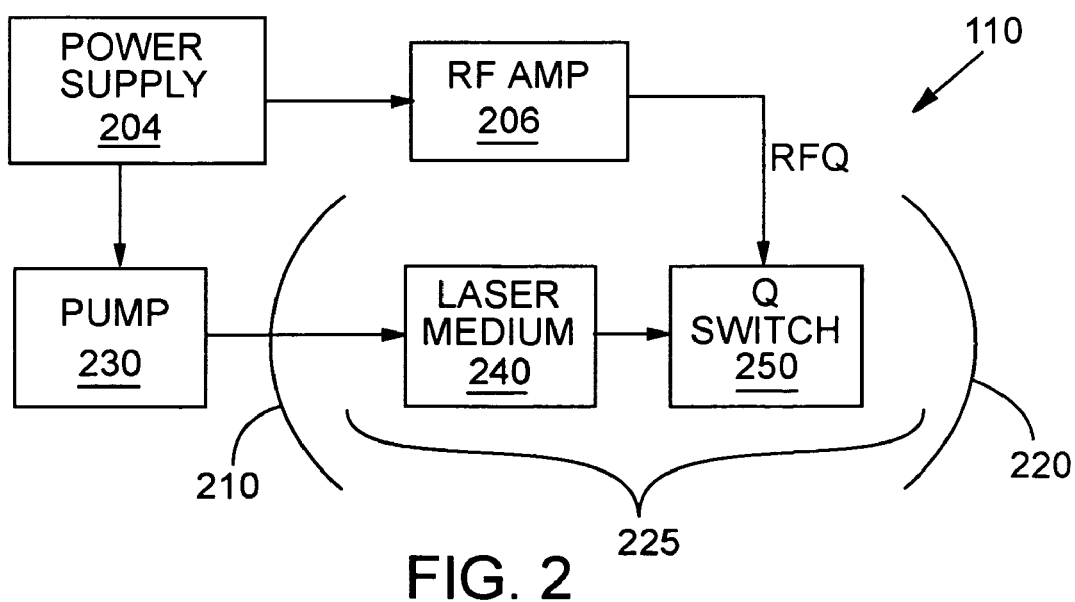
FIG. 2 is a diagram of the laser in the system shown in FIG. 1.

FIG. 2 is a diagram of an embodiment of the laser 110 in simplified form. The laser 110 comprises a laser power supply 204 and RF amplifier 206. The laser 110 also comprises two reflectors 210 and 220, which together define a laser cavity 225, which may be a resonator. The laser 110 also comprises a pump 230, a laser medium 240, and a Q switch 250. Optionally, the laser resonator 225 may also contain an intracavity second harmonic crystal (not shown) and possibly a third harmonic crystal (not shown). The pump 230 pumps energy into the laser medium 240. The pump source 230 preferably provides continuous wave (CW) pumping of the laser medium 240. The laser medium 240 can be, for example, Nd:YLF, Nd:YAG, or Nd:YVO$_4$. Other embodiments of the laser medium 240 may be employed. The pump 230 is preferably a semiconductor laser. Alternatively, the pump 230 may be a flashlamp or arc lamp or other excitation source suitable for pumping the laser medium 240. The pump 230 may further include lenses for efficiently coupling the pump 230 into the laser medium 240. The action of the pump 230 produces excited ions suitable for generation of laser output through the process of stimulated emission. The pump 230 may be physically located at the end of the laser cavity 225 (as shown) or to its side. When the Q switch 250 is closed, energy is stored in the laser cavity 225 as a result of the pumping action. When the Q switch 250 is opened, the stored energy propagates out of the laser cavity 225 as a laser pulse. The opening and closing of the Q switch 250 is controlled by an RF signal RFQ from the RF amp 206. As those skilled in the art will recognize, FIG. 2 is not meant to illustrate the physical arrangement of the laser 110 accurately.

The laser 110 typically operates in pulsed mode, in which the Q switch 250 is alternately closed then opened. During the time when the Q switch 250 is closed, energy is stored in the cavity 225, and that energy is released as a laser pulse when the Q switch 250 is opened. When the laser 110 is repetitively Q-switched, the frequency at which the Q switch 250 is opened is the PRF. As the PRF changes, the properties of the laser pulse (e.g., pulse shape, pulse rise time, pulse width, pulse height, pulse energy, pulse energy stability, etc.) can change significantly. For that reason and because link processing systems are typically highly sensitive to variations in laser pulse properties, lasers in link processing systems typically operate at an approximately fixed nominal PRF at which the laser 110 generates pulses having suitable properties for link blowing. The selection of the nominal PRF may also take into account link processing system parameters, such as the maximum rate at which the controller 190 can process link coordinate information.

Unfortunately, the AOM 140 is not an ideal device in practice. In a real system, the device leaks light energy, especially when the laser 110 has built up a large amount of energy in its cavity 225 resulting in high power laser pulses. Even when the AOM 140 is set to diverge the laser beam 120 away from the propagation path toward the workpiece 130, some light energy does pass to the workpiece 130.

There is a trend in laser processing systems toward generating smaller laser beam spots for use on smaller link structures. This trend manifests itself in two ways. First, there is increasing use of higher numeric aperture lenses, shorter focal distances, and higher quality optics in order to generate smaller spot sizes at traditional IR (infrared) wavelengths. Common link processing systems operate at 1.32 µm, 1.34 µm, 1.064 µm, or 1.047 µm wavelengths, and may contain Nd:YVO$_4$, ND:YAG, or ND:YLF. Spot sizes have traditionally been 1.6 µm in diameter or greater. Smaller spot sizes concentrate laser emissions into a tighter spot at the workpiece, increasing the probability that leaked light will cause damage due to an increased optical fluence.

The second change in laser processing systems is the use of laser wavelengths that are shorter than about 1 µm, such as visible (e.g., green) or UV (ultraviolet) wavelengths. A common method of generating shorter wavelengths is the use of frequency multiplying crystals, such as a frequency multiplier. Common shifted wavelengths include green, such as 532 nm or 524 nm, or UV, such as 355 nm, 349 nm, 266 nm, or 262 nm. Due to the shorter wavelengths, it is possible to focus these visible and UV wavelengths into smaller spots.

An undesirable aspect of the use of wavelengths shorter than about 1 µm is that many of the materials out of which semiconductors and other workpieces are fabricated are highly absorbing at these wavelengths. Thus any leaked optical emissions may cause more damage than IR wavelengths.

Deleterious effects of the undesired laser radiation leakage can occur at different times. In general, the link processing system 100 is in one of three modes: processing, idle, and alignment. In the processing mode, there is generally no need to suppress unwanted laser radiation, but there is generally a need to suppress unwanted laser radiation in the other modes.

Figure 3:
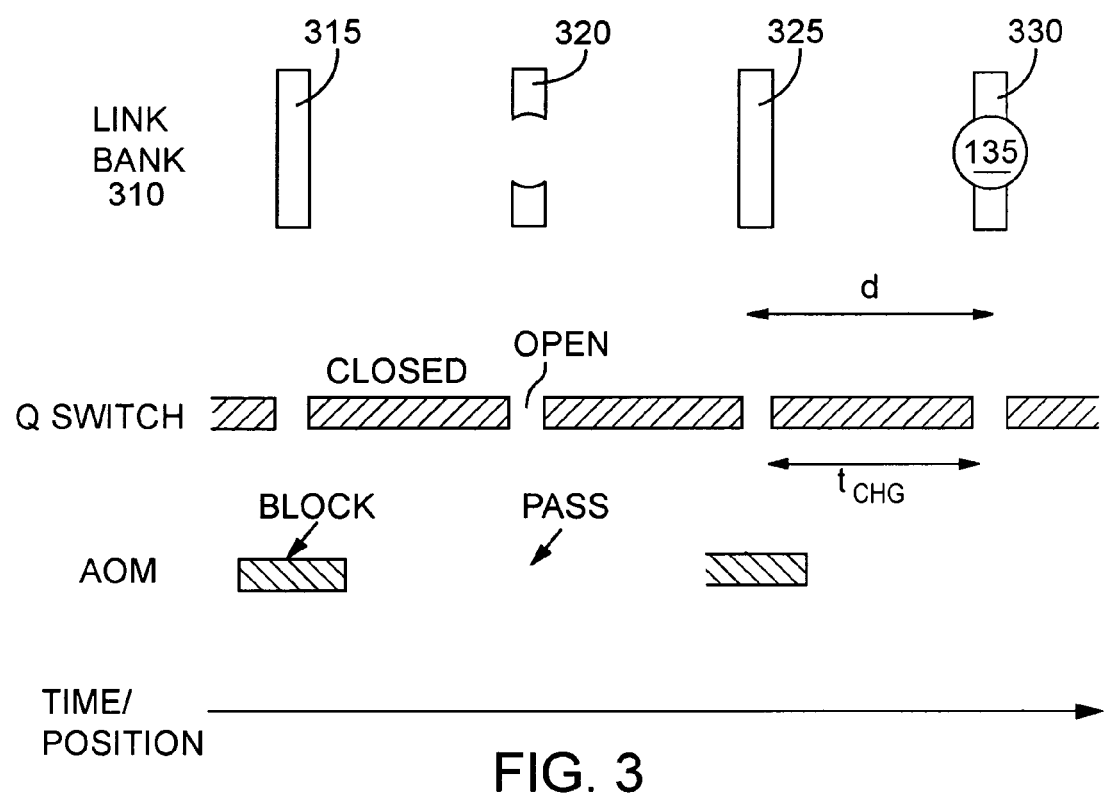
FIG. 3 is a chart showing the states of the Q switch and the AOM of FIGS. 2 and 1, respectively, during processing of a link bank.

A processing mode is illustrated in FIG. 3, which is a chart showing the states of the Q switch 250 and the AOM 140 during processing of a segment of a link bank 310 on the workpiece 130. The link bank 310 comprises a number of regularly spaced links, the illustrated ones in the segment being labeled 315, 320, 325, and 330. The laser beam spot 135 moves along the link bank 310, left to right as shown and is shown over the link 330. Although the laser beam spot is shown as having a circular shape, any shape spanning the width of a single link is acceptable. For example, an elliptical spot with a major and a minor diameter may be used. Before reaching the link 330, the laser beam spot 135 moved across the links 315, 320, and 325 in that order. When the position of the laser beam spot 135 coincided with the positions of the links 315-330, the Q switch 250 was opened to emit a pulse from the laser 110. The commands issued by controller 190 to laser 110 to trigger pulses and AOM 140 to change transmission state may be issued prior to the coincidence of the laser beam spot 135 and the link of interest. This allows time for commands to propagate and system components to complete desired actions, resulting in pulses precisely delivered to the desired location on target links.

When the laser beam spot 135 was over the links 315 and 325, the AOM 140 was in a blocking state so that they were not severed. The AOM 140 was in a passing state when the laser beam spot 135 was on the link 320 so that it was severed by the laser pulse. Likewise, the laser beam spot 135 will sever the link 330, as the AOM 140 is not in a blocking state when the laser beam spot 135 is on the link 330.

In the processing mode illustrated in FIG. 3, the time that the laser cavity 225 charges before each pulse ($t_{CHG}$) approaches the reciprocal of the PRF. Typical PRF values are 40 kHz to 60 kHz, but it is expected that future systems may employ lasers operating at a PRF on the order of hundreds of kiloHertz. During the charging time $t_{CHG}$, the laser cavity 225 builds up an amount of energy that is acceptable for link blowing or other processing activities but may be unacceptably large for certain non-processing modes of operation.

In the idle mode, for example, no laser radiation should ideally reach the workpiece 130. The system 100 may enter an idle mode, for example, between link runs, between link banks in the same link run, or when the workpiece 130 is still. In this mode, the system 100 can advantageously minimize laser radiation reaching the workpiece 130 by opening the Q switch 250 continuously or opening and closing the Q switch 250 at a rate higher than the PRF employed in the processing mode, thereby limiting the amount of energy that builds up in the laser cavity 225 before each pulse. As a result, the laser emits lower energy pulses that may be blocked more effectively by the AOM 140 such that damage does not occur to the workpiece 130. Additionally, AOMs that have a lower extinction ratio can be used in laser systems employing these energy reducing techniques because it is easier to block pulses having lower peak power.

Figure 4A:
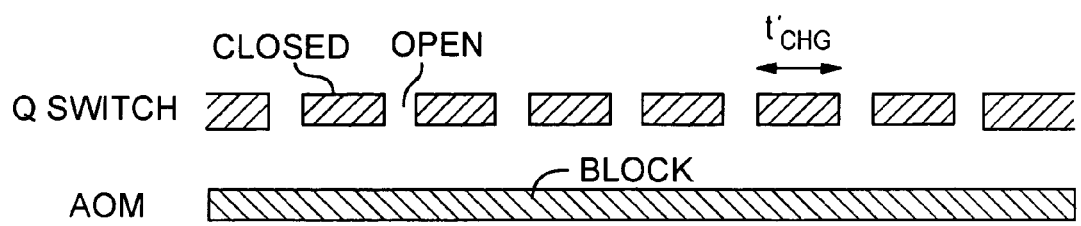
FIGS. 4A, 4B and 5 are charts showing the states of the Q switch and the AOM of FIGS. 1 and 2, respectively, during non-processing modes.
Figure 4B:
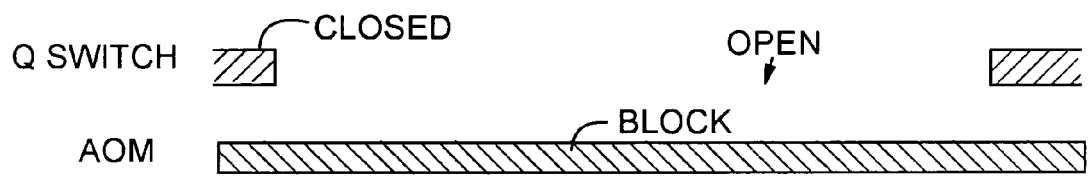

FIGS. 4A and 4B illustrate those two techniques. More specifically, FIGS. 4A and 4B are charts showing the states of the Q switch 250 and the AOM 140 during a non-processing mode, according to those two techniques. In FIG. 4A, the Q switch 250 is opened approximately periodically to cause the laser to emit pulses, just as is done in a processing mode, except more frequently so that the laser 110 does not build up excessive energy. In other words, the laser 110 produces more frequent, less energetic pulses. The pulsing period corresponds to a charging time $t'_{CHG}$, as shown in FIG. 4A. The charging time $t'_{CHG}$ is preferably sufficiently short so that the energy built up in the laser cavity 225 and subsequently emitted in the laser pulses is small enough to be effectively blocked by the AOM 140. For that reason, the AOM 140 is set in a blocking state, as the figure shows. Although FIG. 4A illustrates the AOM 140 in a constant, uninterrupted blocking state, it would be sufficient to set the AOM 140 in its blocking state only when the Q switch 250 is open. Thus, the state of the AOM 140 could be periodically switched at the more rapid pulsing rate.

FIG. 4B is a similar chart depicting another technique for suppressing excessive energy build up in the laser cavity 225 during a non-processing mode, such as an idle mode. Rather than rapidly pulsing the laser 110, the technique shown in FIG. 4B simply leaves the Q switch 250 open for an extended period of time, perhaps for substantially the entire duration of the non-processing mode. (As used herein, the term "substantially" is meant as a term of approximation.) In such a state, the laser 110 may emit a small amount of radiation, but that can typically be effectively blocked by the AOM 140 in its blocking state, as shown in the figure.

To summarize, FIG. 4 illustrates two representative techniques for preventing undesired radiation from reaching the workpiece 130. According to a first technique, the Q switch 250 is alternately opened and closed at a rate grater than the processing mode PRF, so as to cause the laser 110 to emit more rapid, less energetic pulses that the AOM 140 can more effectively block. According to a second technique, the Q switch 250 is simply left open, causing the laser 110 to emit a small amount of radiation, which the AOM 140 can effectively block. Both techniques open the Q switch 250 more than in the processing mode. Both techniques draw energy out of the laser cavity 225, thus preventing a large build up of energy in the laser cavity 225. With both techniques, the AOM 140 is preferably set in a blocking state to prevent the less energetic laser emissions from reaching the workpiece 130.

Other techniques can accomplish the same goal. For example, a hybrid of the two techniques illustrated in FIG. 4 is possible. One hybrid technique would leave the Q switch 250 open and periodically close it briefly, resulting in a low energy pulse that is blocked by the AOM 140. Alternatively, pulses in excess of the PRF can be generated with a random or non-periodic PRF.

Figure 5:
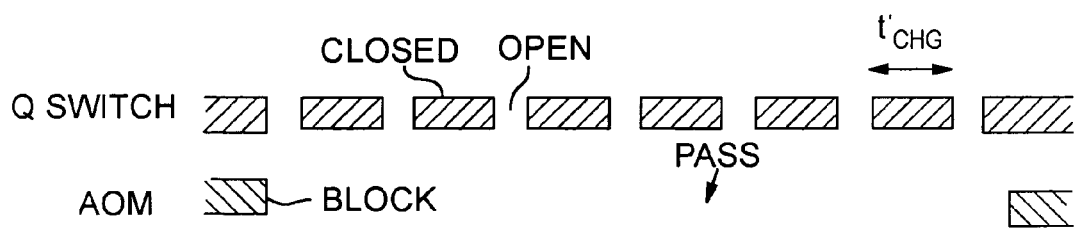

In an alignment mode, laser radiation can also be suppressed using the rapid pulsing technique, as shown in FIG. 5. In this case, the Q switch 140 is opened at a faster rate so that the laser 110 emits more rapid, less energetic pulses. If the pulse rate is sufficiently high, those pulses begin to be effectively like a continuous-wave (CW) laser beam. This mode, however, differs from the idle mode, in that the less energetic laser radiation desirably reaches the workpiece 130, where it reflects from an alignment area to the reflected energy sensor 198 that receives the reflected energy and converts it into electrical signals that are representative of the optical energy received at the sensor. Thus, the AOM 140 is in a passing state in this mode, as shown in FIG. 5. The AOM 140 may pass light in either a fully open mode, or a partially transmitting mode, in which laser radiation is partially blocked. This reduces, but does not eliminate, the amount of light reaching the target such that alignment can occur without damage to the workpiece 130. Alternatively, the AOM 140 may change states in the alignment mode, as described above with regard to the idle mode.

Not only does the smaller amount of energy in the more rapid, less energetic pulses help prevent damage to the workpiece 130, but it is also possible that the different pulse properties of such pulses (typically longer pulse width) may also be a factor contributing to less damage to the workpiece.

Alignment scans may be performed with either CW or pulsed light. In the pulsed mode of target scanning, the generating of optical pulses, receiving and capturing of reflected signals, and capturing of position coordinates are synchronized to enhance the quality of the calibration data. This synchronization typically involves capturing data at instances in time when the output power of the pulsed laser is approximately constant.

Scans for Z depth focusing typically involve interpretation of the received optical signals and stage position signals to compute a spot size. Alignment target scans performed with the focusing lens 160 at different Z heights will result in different spot size measurements, because the laser spot size changes as the focused beam waist is moved above or below the alignment target. The focus distance is the Z height separation resulting in the smallest spot size. This focus distance may be inferred from a number of spot size measurements at different focus heights.

Alignment scans may additionally be used to determine the scale and the rotation of the workpiece coordinate system relative to the coordinate system of the laser processing system 100. Alignment data can be used to determine the precise location of links to be processed in the coordinate system of the laser processing system 100.

Unless steps are taken to prevent the build-up of energy in the laser cavity 225 during the idle and alignment modes of operation, the workpiece 130, elements of the beam propagation path, or laser can become damaged. For example, excessive laser radiation can damage or destroy alignment areas on the workpiece 130 or other areas that are not meant to be irradiated. Although damage is possible at IR wavelengths (e.g., greater than 1.2 µm), the damage can be more severe at shorter wavelengths (e.g., less than 1 µm), especially UV wavelengths, which are typically absorbed to a greater extent by many workpiece materials. The problem can also be more significant as the size of the laser beam spot 135 decreases (e.g., less than 1.6 µm or 1.4 µm across) because that intensifies the radiation in a smaller area. This problem is becoming increasingly more significant as device feature sizes and link sizes are following a strong and consistent trend toward smaller design rules and dimensions. As the laser beam spot 135 keeps pace with that trend, the energy concentration in the laser beam spot 135 increases, and the likelihood of damage to the workpiece increases.

Moreover, for lasers that are constrained to operate in pulsed mode only, performing alignment at a higher effective PRF has the advantage of increasing the speed at which alignment operations can be performed and thus increasing overall system throughput.

The algorithms for operating the methods and systems illustrated and described herein can exist in a variety of forms both active and inactive. For example, they can exist as one or more software programs comprised of program instructions in source code, object code, executable code or other formats. Any of the above can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A method for decreasing the amount of undesired laser radiation reaching a workpiece from a laser having a laser cavity and a Q-switch, the laser operating at any given time in one of at least two modes, a first mode in which the laser emits pulses at a pulse repetition frequency for selectively irradiating targets on or within a workpiece, the pulses propagating along a propagation path to the workpiece, and a second mode, which is an idle mode in which no laser radiation desirably reaches the workpiece, the method being operable during the second mode, the method comprising:
   opening the Q-switch more than the Q-switch is open in the first mode, thereby limiting the amount of energy that builds up in the laser cavity and decreasing the peak energy of the laser radiation emitted in the second mode, wherein the opening step comprises repeatedly closing and opening the Q-switch at a rate greater than the PRF, thereby causing the laser to emit more rapid and less energetic pulses than in the first mode; and
   substantially preventing the more rapid and less energetic pulses from reaching the workpiece.

2. A method for decreasing the amount of undesired laser radiation reaching a workpiece from a laser having a laser cavity and a Q-switch, the laser operating at any given time in one of at least two modes, a first mode in which the laser emits pulses at a pulse repetition frequency for selectively irradiating targets on or within a workpiece, the pulses propagating along a propagation path to the workpiece, and a second mode in which less or no laser radiation desirably reaches the workpiece, the method being operable during the second mode, the method comprising:
   opening the Q-switch more than the Q-switch is open in the first mode, thereby limiting the amount of energy that builds up in the laser cavity and decreasing the peak energy of the laser radiation emitted in the second mode, wherein the opening step comprises repeatedly closing and opening the Q-switch at a rate greater than the PRF, thereby causing the laser to emit more rapid and less energetic pulses than in the first mode,
   wherein the workpiece includes an alignment area, and the second mode is an alignment mode in which the laser radiation desirably reaches the alignment area of the workpiece with less energy than the laser radiation emitted in the first mode.

3. A method for decreasing the amount of undesired laser radiation reaching a workpiece from a laser having a laser cavity and a Q-switch, the laser operating at any given time in one of at least two modes, a first mode in which the laser emits pulses at a pulse repetition frequency for selectively irradiating targets on or within a workpiece, the pulses propagating along a propagation path to the workpiece, and a second mode in which less or no laser radiation desirably reaches the workpiece, the method being operable during the second mode, the method comprising:
   opening the Q-switch more than the Q-switch is open in the first mode, thereby limiting the amount of energy that builds up in the laser cavity and decreasing the peak energy of the laser radiation emitted in the second mode.
   wherein the opening step comprises leaving the Q-switch open for substantially the entire duration of the second mode.

4. The method of claim 3, wherein the second mode is an idle mode in which no laser radiation desirably reaches the workpiece, the method further comprising:
   substantially preventing the laser emissions from reaching the workpiece while the Q-switch is open.

5. The method of claim 3, wherein the workpiece includes an alignment area, and the second mode is an alignment mode in which the laser radiation desirably reaches the alignment area of the workpiece with less energy than the laser radiation emitted in the first mode.

6. A method for decreasing the amount of undesired laser radiation reaching a workpiece from a laser having a laser cavity and a Q-switch, the laser operating at any given time in one of at least two modes, a first mode in which the laser emits pulses at a pulse repetition frequency for selectively irradiating targets on or within a workpiece, the pulses propagating along a propagation path to the workpiece, and a second mode in which less or no laser radiation desirably reaches the workpiece, the method being operable during the second mode, the method comprising:
   opening the Q-switch more than the Q-switch is open in the first mode, thereby limiting the amount of energy that builds up in the laser cavity and decreasing the peak energy of the laser radiation emitted in the second mode,
   wherein the targets are electrically conductive links that are severed when irradiated with laser pulses in the processing mode.

7. A method for decreasing the amount of undesired laser radiation reaching a workpiece from a laser having a laser cavity and a Q-switch, the method comprising:
   operating the laser in a processing mode in which the Q-switch is repeatedly opened and closed so as to cause the laser to emit pulses approximately periodically at a PRF for selectively irradiating targets on or within a workpiece, the pulses propagating along a propagation path toward the workpiece;
   operating the laser in a non-processing mode in which the Q-switch is open more often than the Q-switch is open in the processing mode, thereby limiting the amount of energy that builds up in the laser cavity and causing the laser to emit less radiation along the propagation path to the workpiece than in the processing mode, wherein the step of operating the laser in the non-processing mode comprises repeatedly closing and opening the Q-switch at a rate greater than the PRF, thereby causing the laser to emit more rapid and less energetic pulses than in the processing mode, and wherein the non-processing mode is an idle mode in which no laser radiation desirably reaches the workpiece;

substantially preventing the more rapid and less energetic pulses from reaching the workpiece.

8. A method for decreasing the amount of undesired laser radiation reaching a workpiece from a laser having a laser cavity and a Q-switch, the method comprising:

operating the laser in a processing mode in which the Q-switch is repeatedly opened and closed so as to cause the laser to emit pulses approximately periodically at a PRF for selectively irradiating targets on or within a workpiece, the pulses propagating along a propagation path toward the workpiece; and operating the laser in a non-processing mode in which the Q-switch is open more often than the Q-switch is open in the processing mode, thereby limiting the amount of energy that builds up in the laser cavity and causing the laser to emit less radiation along the propagation path to the workpiece than in the processing mode, wherein the step of operating the laser in the non-processing mode comprises repeatedly closing and opening the Q-switch at a rate greater than the PRF, thereby causing the laser to emit more rapid and less energetic pulses than in the processing mode, wherein the workpiece includes an alignment area, and the second mode is an alignment mode in which the laser radiation desirably reaches the alignment area of the workpiece with less energy than the laser radiation emitted in the processing mode.

9. A method for decreasing the amount of undesired laser radiation reaching a workpiece from a laser having a laser cavity and a Q-switch, the method comprising:

operating the laser in a processing mode in which the Q-switch is repeatedly opened and closed so as to cause the laser to emit pulses approximately periodically at a PRF for selectively irradiating targets on or within a workpiece, the pulses propagating along a propagation path toward the workpiece; and operating the laser in a non-processing mode in which the Q-switch is open more often than the Q-switch is open in the processing mode, thereby limiting the amount of energy that builds up in the laser cavity and causing the laser to emit less radiation along the propagation path to the workpiece than in the processing mode, wherein the step of operating the laser in the non-processing mode comprises leaving the Q-switch open for substantially the entire duration of the non-processing mode.

10. The method of claim 9, wherein the non-processing mode is an idle mode in which no laser radiation desirably reaches the workpiece, the method further comprising:

substantially preventing the laser emissions from reaching the workpiece while the Q-switch is open.

11. The method of claim 9, wherein the workpiece includes an alignment area, and the second mode is an alignment mode in which the laser radiation desirably reaches the alignment area of the workpiece with less energy than the laser radiation emitted in the processing mode.

12. The method of one of claims 1, 2, 3, 6, 7, 8, or 9 wherein the workpiece is a semiconductor substrate.

13. The method of one of claims 1, 2, 3, 6, 7, 8, or 9, wherein the laser pulses have a wavelength less than approximately 1 µm or greater than approximately 1.2 µm.

14. The method of one of claims 1, 2, 3, 6, 7, 8, or 9, wherein the pulse repetition frequency is at least about 40 kHz.

15. The method of one of claims 1, 2, 3, 6, 7, 8, or 9, wherein the laser pulses intersect the workpiece at a laser beam spot, and the spot has a spatial size on the workpiece, and the size of the spot is less than about 1.6 µm across.

16. A system for selectively decreasing the amount of laser radiation reaching a workpiece, the system comprising:
a pulsed laser having a Q-switch;
a laser beam propagation path from the laser to the workpiece;
a light shutter disposed in the propagation path after the pulsed laser and before the workpiece, the light shutter selectively passing or blocking the laser pulses from reaching the workpiece;
a controller connected to the Q-switch, wherein the controller generates a control signal that causes the Q-switch to open or to close, the controller operating in at least two modes including:
a first mode wherein the Q-switch is closed for a first charging time before being opened to emit a pulse having a first energy related to the first charging time; and
a second mode wherein the Q-switch is closed, if at all, for no continuous time as long as the first charging time, whereby the laser emits radiation at an second energy level less than the first energy; and
a position sensor that collects position data indicative of the point at which the laser beam propagation path intersects the workpiece, wherein opening of the Q-switch in the second mode based is based on the position data.

17. A system for selectively decreasing the amount of laser radiation reaching a workpiece, the system comprising:
a pulsed laser having a Q-switch;
a laser beam propagation path from the laser to the workpiece;
a light shutter disposed in the propagation path after the pulsed laser and before the workpiece, the light shutter selectively passing or blocking the laser pulses from reaching the workpiece; and
a controller connected to the Q-switch, wherein the controller generates a control signal that causes the Q-switch to open or to close, the controller operating in at least two modes including:
a first mode wherein the Q-switch is closed for a first charging time before being opened to emit a pulse having a first energy related to the first charging time, wherein the first mode is a link processing mode wherein the laser pulses irradiate selected links on the workpiece; and
a second mode wherein the Q-switch is closed, if at all, for no continuous time as long as the first charging time, whereby the laser emits radiation at an second energy level less than the first energy, wherein the second mode is an idle mode in which no laser radiation desirably reaches the workpiece, and wherein the light shutter is in a blocking state.

18. The system of claim 17, wherein the light shutter is an AOM.

19. A system for selectively decreasing the amount of laser radiation reaching a workpiece, the system comprising:
a pulsed laser having a Q-switch;
a laser beam propagation path from the laser to the workpiece;
a light shutter disposed in the propagation path after the pulsed laser and before the workpiece, the light shutter selectively passing or blocking the laser pulses from reaching the workpiece; and a controller connected to the Q-switch, wherein the controller generates a control signal that causes the Q-switch to open or to close, the controller operating in at least two modes including:
- a first mode wherein the Q-switch is closed for a first charging time before being opened to emit a pulse having a first energy related to the first charging time, wherein the first mode is a link processing mode wherein the laser pulses irradiate selected links on the workpiece; and
- a second mode wherein the Q-switch is closed, if at all, for no continuous time as long as the first charging time, whereby the laser emits radiation at an second energy level less than the first energy, wherein the second mode is an alignment mode in which a lesser amount of laser radiation desirably reaches the an alignment area on the workpiece, and wherein the light shutter is in a passing state in the alignment mode.

20. The system of claim 19, wherein the light shutter is an AOM.

21. The system of claim 19, wherein the passing state is a partially transmissive state.

22. A system for selectively decreasing the amount of laser radiation reaching a workpiece, the system comprising:
- a pulsed laser having a Q-switch;
- a laser beam propagation path from the laser to the workpiece;
- a light shutter disposed in the propagation path after the pulsed laser and before the workpiece, the light shutter selectively passing or blocking the laser pulses from reaching the workpiece; and
- a controller connected to the Q-switch, wherein the controller generates a control signal that causes the Q-switch to open or to close, the controller operating in at least two modes including:
  - a first mode wherein the Q-switch is closed for a first charging time before being opened to emit a pulse having a first energy related to the first charging time; and
  - a second mode wherein the Q-switch is closed, if at all, for no continuous time as long as the first charging time, whereby the laser emits radiation at an second energy level less than the first energy, wherein in the second mode the controller repeatedly closes and opens the Q-switch at a sufficiently high rate that the Q-switch is not closed for a continuous time as long as the predetermined charging time, thereby causing the laser to emit more rapid and less energetic pulses than in the first mode.

23. A system for selectively decreasing the amount of laser radiation reaching a workpiece, the system comprising:
- a pulsed laser having a Q-switch;
- a laser beam propagation path from the laser to the workpiece;
- a light shutter disposed in the propagation path after the pulsed laser and before the workpiece, the light shutter selectively passing or blocking the laser pulses from reaching the workpiece; and
- a controller connected to the Q-switch, wherein the controller generates a control signal that causes the Q-switch to open or to close, the controller operating in at least two modes including:
  - a first mode wherein the Q-switch is closed for a first charging time before being opened to emit a pulse having a first energy related to the first charging time; and
  - a second mode wherein the Q-switch is closed, if at all, for no continuous time as long as the first charging time, whereby the laser emits radiation at an second energy level less than the first energy, wherein in the second mode the controller leaves the Q-switch open for substantially the entire duration of the second mode.

* * * * *